(12) United States Patent
Berthold et al.

(10) Patent No.: US 11,754,910 B2
(45) Date of Patent: Sep. 12, 2023

(54) SYSTEM FOR ILLUMINATING THE FACE OF AN OCCUPANT IN A CAR

(71) Applicant: Hella GmbH & Co. KGaA, Lippstadt (DE)

(72) Inventors: René Berthold, Maulburg (DE); Ana Bizal, Freiburg im Breisgau (DE); Simon Luetzelschwab, Rheinfelden (DE); Heiko Schoene, Zell im Wiesental (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 17/821,590

(22) Filed: Aug. 23, 2022

(65) Prior Publication Data
US 2023/0055583 A1    Feb. 23, 2023

(51) Int. Cl.
| | | |
|---|---|---|
| *G03B 15/03* | (2021.01) | |
| *H05B 47/115* | (2020.01) | |
| *B60Q 3/70* | (2017.01) | |
| *B60Q 3/16* | (2017.01) | |
| *H05B 47/11* | (2020.01) | |
| *H05B 45/32* | (2020.01) | |
| *B60K 35/00* | (2006.01) | |

(52) U.S. Cl.
CPC .............. *G03B 15/03* (2013.01); *B60K 35/00* (2013.01); *B60Q 3/16* (2017.02); *B60Q 3/70* (2017.02); *H05B 45/32* (2020.01); *H05B 47/11* (2020.01); *H05B 47/115* (2020.01); *B60K 2370/1529* (2019.05); *B60K 2370/33* (2019.05)

(58) Field of Classification Search
CPC .............................. G03B 15/03; H05B 47/115
See application file for complete search history.

(56) References Cited

U.S. PATENT DOCUMENTS

| | | | |
|---|---|---|---|
| 5,929,909 A | 7/1999 | Hoelzemann et al. | |
| 2003/0015645 A1 | 1/2003 | Brickell et al. | |
| 2007/0103747 A1* | 5/2007 | Powell | G02B 13/22 348/E9.026 |
| 2007/0193811 A1* | 8/2007 | Breed | B60R 21/01552 180/271 |
| 2008/0186701 A1 | 8/2008 | Omi | |
| 2012/0249797 A1* | 10/2012 | Haddick | G04G 21/04 701/491 |

(Continued)

FOREIGN PATENT DOCUMENTS

| | | |
|---|---|---|
| DE | 10012749 A1 | 12/2001 |
| DE | 602005005783 T2 | 7/2009 |

(Continued)

OTHER PUBLICATIONS

Deegan, Brian. "LED flicker: Root cause, impact and measurement for automotive imaging applications." Electronic Imaging 2018.17 (2018): 146-1.

*Primary Examiner* — Christopher E Dunay
(74) *Attorney, Agent, or Firm* — Husch Blackwell LLP

(57) ABSTRACT

A system is provided for illuminating the face of an occupant for a video call in a car. At least one light source has a main light emission direction (A) which is directed toward the face of the occupant. The system also includes a camera provided to record the face of the occupant. The system controls the light source in such a way to obtain a flickering free recording of the face of the occupant.

17 Claims, 3 Drawing Sheets

(56) References Cited

U.S. PATENT DOCUMENTS

| | | | |
|---|---|---|---|
| 2015/0054933 A1 | 2/2015 | Wasiek et al. | |
| 2015/0379362 A1* | 12/2015 | Calmes | G06V 10/145 |
| | | | 348/136 |
| 2017/0212633 A1* | 7/2017 | You | G06F 3/0412 |
| 2018/0086260 A1* | 3/2018 | Barillot | B60K 35/00 |
| 2018/0315288 A1* | 11/2018 | Kim | H04N 5/232 |
| 2020/0051531 A1* | 2/2020 | Higashiyama | G09G 5/373 |
| 2020/0053332 A1* | 2/2020 | Seok | H04N 9/735 |
| 2020/0110463 A1 | 4/2020 | Kawamura | |
| 2021/0127051 A1 | 4/2021 | Lai et al. | |
| 2022/0252962 A1* | 8/2022 | Suto | G03B 15/03 |

FOREIGN PATENT DOCUMENTS

| | | |
|---|---|---|
| DE | 102014013267 A1 | 3/2015 |
| DE | 102016013294 A1 | 5/2017 |
| DE | 102018215056 A1 | 3/2020 |
| DE | 102020002847 A1 | 8/2020 |
| DE | 102019211849 A1 | 2/2021 |
| JP | 2020178302 A | 10/2020 |
| WO | 2019200434 A1 | 10/2019 |

\* cited by examiner

SYSTEM FOR ILLUMINATING THE FACE OF AN OCCUPANT IN A CAR

CROSS REFERENCE

This application claims priority to European Application No. 21192574.8, filed Aug. 23, 2021, the entirety of which is hereby incorporated by reference.

FIELD OF THE INVENTION

The invention relates to a system for illuminating the face of an occupant for a video call in a car, comprising at least one light source, the light source having a main light emission direction which is directed to the face of the occupant.

BACKGROUND OF THE INVENTION

Document DE 10 2018 215 056 A1 discloses a camera in the vehicle interieur of a car, and the camera is thought to take pictures or videos of the occupants.

Document DE 10 2020 002 847 A1 discloses a system to hold a video conference in the vehicle interieur of a car, whereas a camera is installed to record the face of the occupant.

Usually, the illumination of the face of the occupant is poor inside the interior of a car, in particular when the occupant is the driver of the car or is sitting on the rear seat. When the car is performed to drive semi-autonomous or full-autonomous, the face of the driver must be illuminated in a comfortable and pleasant manner in order to notblind the driver or any occupant but to illuminate the face in order to obtain a high-quality video recording, at least when the car is not full-autonomous driving.

Usually, the interieur-illumination of a car is not directed to the occupants faces but directed to the leg room, the center console, or the dashboard. The only illumination device to illuminate the face of the occupant is known from sun shades, as disclosed in DE 60 2005 005 783 T2. Such illumination devices are usually not suited to illuminate the face of an occupant in such way, that a video recording provides a high-class video quality.

BRIEF SUMMARY OF THE INVENTION

Therefore, it is an object of the present invention to provide a system for illuminating the face of an occupant for a video call in a car, comprising at least one light source, and the light source should have a main light emission direction which is directed to the face of the occupant. The system comprising the at least one light source has to be qualified in such a way, that a high-class video recording within the vehicle interieur is enabled.

The invention discloses the technical teaching that the system comprises a camera, and the camera is provided to record the face of the occupant, whereas the system is performed to control the light source in such a way to obtain a flickering free recording of the face of the occupant.

Artificial light sources, in particular semiconductor-light sources as LEDs or OLEDs, do not continuously emit light as it is believed by human eyes, instead they turn on and off at a certain frequency. This leads to a flickering effect in particular when a video camera is used to record the face of an occupant, which is illuminated by a semiconductor-light source. To solve this effect, the inventive system controls the light source in such a way to match the so-called frame rate of the artificial light to the frame rate of the camera. This leads to a flickering free recording of the face of the occupant. As a result, the video recording in the vehicle interieur is of high quality and the occupant can take part in a video conference with other participants.

In particular, the system provides a control unit which control unit is connected to the at least one light source and provides pulsed operating to control the light source. The pulsed frequency to operate the light source is matched to the frame rate of the applied camera of the system.

The control unit is connected to the camera and the horizontal frequency of the camera is received and/or controlled by the control unit. The horizontal frequency is the result of the frame rate to operate the camera.

The control unit is performed to control the light source with a frequency which is depending on the horizontal frequency of the camera, the so called frame rate. As a result, the horizontal frequency of the camera is matched to the pulse rate of the light source.

Moreover, the system comprises at least one light sensor, which light sensor is connected to the control unit, and the light sensor is arranged to detect the light of the surrounding area. The controlling of the at least one light source and/or the setting of the camera by means of the control unit of the system can additionally or preferentially depend on the surrounding light, for example if a solar irradiation is detected at present or not, e.g., when it is cloudy, rainy or it is already dark night. This leads to totally different settings of operating the at least one light source or, in particular, more than one light source, namely two, three, four or more light sources.

Accordingly, the system can comprise at least two light sources or more than two light sources, whereas at least one light source is positioned in such a way that the main light emission direction comprises an angle to a viewing axis of the occupant, which angle α is >0. It has been found that a cove light leads to the best results for illuminating the face of an occupant, but nevertheless another light source, e. g. with a lower light intensity, can directly illuminate the face of the occupant from the direct front viewing axis. In other words, at least one light source, e.g., combined with the camera, can be positioned in a center in front of the face of the occupant and at least one or preferred two light sources can provide a cove light, a top light or a light source underneath the face to provide a full and evenly balanced illumination of occupant's face. The light sources can be operated with different power to provide a different brightness.

According to yet another embodiment, the system comprises at least one face sensor, which face sensor is connected to the control unit and the face sensor is arranged to detect the light or light distribution in the face and/or to detect the skin color of the occupant. The control unit is performed to operate the at least one light source and/or the settings of a camera depending on the measuring values of the face sensor. If the face is illuminated very bright, in particular, when the surrounding area provides another light illumination into the vehicle interieur, the at least one light source can be powered down. When the face sensor detects a poor illumination of the face or a part of the face of the occupant than the at least one light source can be powered up or down with more or less light.

The at least one light source comprises a semiconductor emitter, in particular a LED or an OLED, and the light source features a color rendering index (CRI) of at least 80, preferred at least 85 and most preferred at least 90 or up to 100. In other words, the semiconductor emitter is performed to emit a high quality light with a nearly full visible spectrum of colors.

According to another advantage, the light source features a colored temperature range of 2,700 K to 5,000 K and/or the intensity range amounts 10 lm to 900 lm.

Moreover, the system comprises a display which is provided in front of the occupant, whereas the display is connected to the control unit. In particular, the brightness of the display can be controlled by the control unit depending on the operating mode of the light source and/or depending on the irradiated light of the surrounding area. The display can also form one of the light sources and can be adjusted in the brightness or in the color as needed to obtain the desired color in the face of the occupant.

According to jet another aspect of the invention a glare shield is provided, whereas the glare shield is arranged in conjunction with the light source. A glare shield can be of substantive help to direct the emitted light by the light source to the face of the occupant in the car, in particular at night, when the surrounding of the car is not illuminated and is dark, respectively.

To obtain another advantage of the invention, the glare shield is preferably arranged in front of the light source in such a way that the main light emission direction runs through the glare shield. In this arrangement the light emitted by the light source passes through the glare shield. The glare shield features a planar extension with a certain thickness, and the planar extension of the glare shield is aligned planar in front of the emitting side of the light source and the passing direction of the light through the glare shield aligns with the thickness direction of the glare shield.

The glare shield is arranged in such a way that light, in particular scattered light, emitted by the light source, is prevented from shining against the inner surface of the windows or the sunroof of the car. In particular it can be avoided that light shines on the inner surface of the side windows, in order to minimize scattered light.

According to one preferred embodiment the glare shield features a honeycomb structure or a grid of holes through which the light of the light source is running. The quotient of the lateral extensions of the openings, namely the honey combs or the holes in general, which are applied in the glare shield, related to the thickness of the glare shield can be <1 to obtain small light passage ways in the glare shield and thus to obtain a light aligning effect.

The glare shield can be attached to the light source or to any other holding element by a clip system or preferred by magnet clips. This enables the occupant to attach and remove the glare shield as far as wanted or as necessary. Moreover the material and the surface of the glare shield can be colored in such a way that the light passing through the glare shield is influenced by the color of the glare shield or the glare shield is performed in conjunction with a color filter for the light of the light source. According to the latter, the occupant can choose between different glare shields and thus between different color effects to color the light of the light source illuminating his face. When the system for illuminating the face of the occupant is not in use, the glare shield can be removed from the light source.

The objective of the invention is also solved by a method to operate a system according to the description above, whereas the at least one light source is operated depending on at least one further information at least comprising the light of the surrounding area, received by the light sensor.

The method according to the invention is performed to operate the at least one light source depending on the skin color of the face of the occupant received by the face sensor.

The at least one light source can be operated additionally depending on the content of the occupant's video call which is received by the camera and displayed by the display. This means that the control unit is programmed in such a way that the look and appearance of the occupant's face can be different for a private video call, e. g. with family, or for a business video call, e.g., with the firm, with a customer or the like. For example, a private video call needs a warm, well colored face of the occupant, and the in a business video the appearance of the face of the occupant can be more strict or having a more authoritarian look, e.g. with less warm colors.

It is also thinkable that the system comprises a microphone and when the occupant talks very strong and hard, the illumination of the face is colored more authoritarian, and when the system receives a more silent voice from the occupant with a warm mood of the occupant, the illumination of the face can be warmer.

According to yet another advantage, the at least one light source is operated depending on the content of the occupant's video call which is received by the camera and displayed by the display. The display is advantageously performed as a touch-display, and the occupant can choose between different settings how the illumination of his face should be performed. In other words, the system provides the automatic adjustment of the illumination of the face or the system provides the possibility to choose a preferred illumination or illumination mood the occupant wants to have for his face.

According to yet another advantage, at least one reference skin color of the face of the occupant is implemented into the control unit, and the at least one light source is operated in such a way that the reference skin color of the face of the occupant is depending on the content of the occupant's video call.

Finally, the reference skin color can depend on the content of the video call and the control unit is performed to select the reference skin color depending on the content of the video call. Subsequently, the actual illumination of the face is performed depending on what reference color has been selected.

The aforementioned embodiments, as well as the claimed components of the system and the method to be used in accordance with the invention in the described embodiments, are not subject to any special exceptions with respect to their size, shape, material selection and technical concept such that the selection criteria known in the pertinent field can be applied without limitations.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

Figure 1:
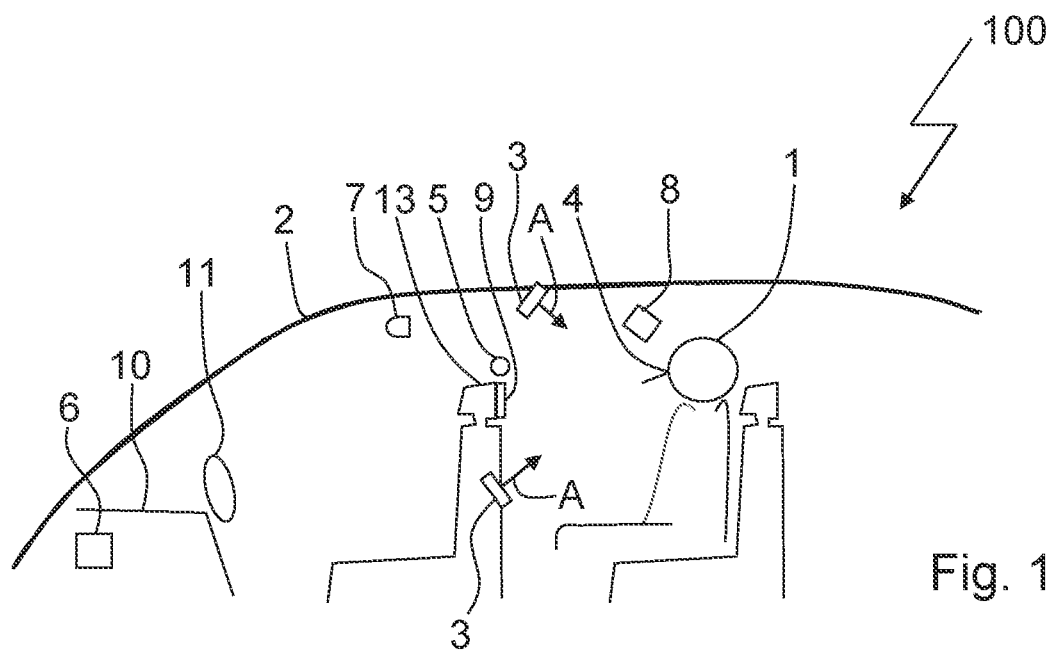
FIG. 1 is a schematical side view of a car and an occupant with a system applied in the car according to the present invention.

FIG. 1 shows a side view of a car 2 comprising a system 100 according to the present invention. The system 100 is performed for illuminating the face of an occupant 1 sitting on the back seat of the car 2. The system 100 comprises several light sources 3, which emit light with a main light emission direction A onto the face 4 of the occupant 1.

The system 100 comprises a camera 5, and the camera 5 is provided to record the face 4 of the occupant 1, whereas the embodiment shows the camera 5 on top of the head rest 13 of the front seat. Additionally, to the head rest 13 the display 9 is attached, so that the occupant 1 can view onto the display 9 in a convenient manner and the face 4 can be recorded by the camera 5 from a convenient position.

A first light source 3 is arranged directly under the roof of the car 2, and another light source 3 is arranged in the lower area of the front seat of the car 2. Both light sources 3 are adjusted so that the main light emission direction A is directed to the face 4 of the occupant 1.

The system also comprises a face sensor 8 for measuring the skin color of the occupant's face 4, and the system 100 comprises a light sensor 7 for detecting the circumference or ambient light conditions.

As a core the system 100 a control unit 6 is provided, which is depicted in the dash board 10 of the car 2 together with the steering wheel 11.

Figure 2:
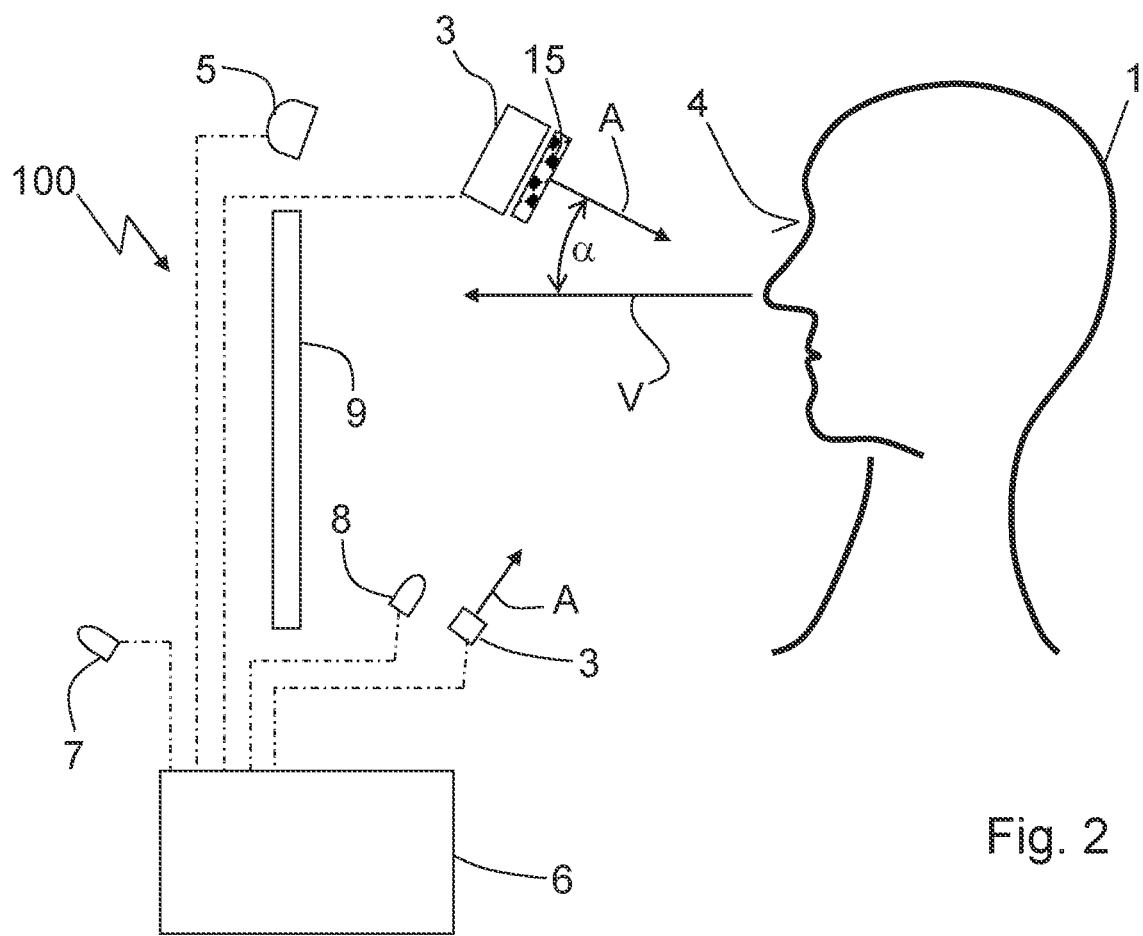
FIG. 2 is a schematic view of the system with the components to be used in a car.

FIG. 2 shows the system 100 with the several elements in a schematic view but without the car 2 according to FIG. 1.

The head of the occupant 1 is shown with his face 4, and the main viewing axis V is shown in a horizontally manner. The first light source 3 is placed above the face 4 and the second light source 3 is placed in a lower position. The camera 5 is arranged on top of the display 9 and the display 9 is arranged in front of the face 4 of the occupant 1 and the viewing axis V forms a surface normal to the surface of the display 9. The face sensor 8 is provided to measure the color of and/or the brightness in the face 4, and the light sensor 7 is performed to measure the ambient light.

The upper light source 3 is arranged under an angle α to the viewing axis V of the occupant 1, which leads to a cove light, which is resulting in the best illumination of the face 4. As an example, a glare shield 15 is provided in the front of the light source 3, and the light passes the glare shield 15 and is thus aligned to the main light emission direction A.

The components as named above are controlled by the control unit 6, which also can be part of the display 9. As another embodiment, the display 9 combined with the control unit 6, camera 5 and/or the face sensor 8 can be a smart phone or a tablet PC, which is attached in an appropriate position inside the car.

The at least one light source 3 or several light sources 3 are arranged in the car at different positions, whereas according to another embodiment the light source 3 can be performed by the display 9. The display 9 also can illuminate the face 4 of the occupant 1, and in or behind the display 9 another light source 3 can be arranged.

Figure 3:
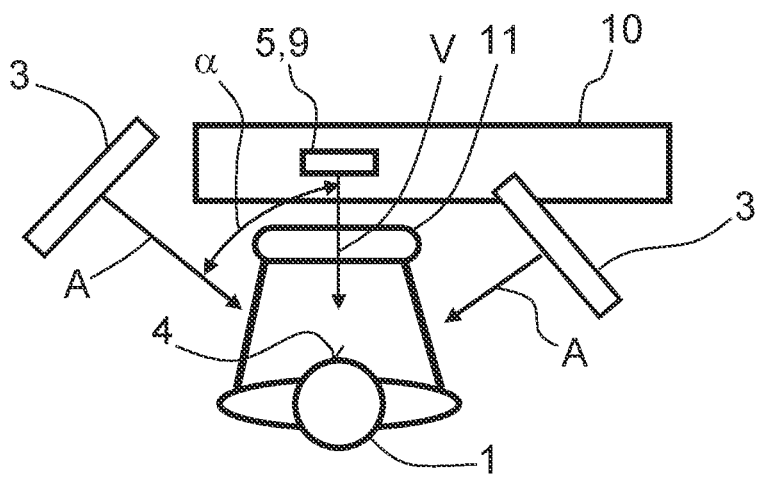
FIG. 3 illustrates a first embodiment of the positioning the light sources.

FIG. 3 shows a first embodiment of arranging light sources 3 as cove lights, forming an angle α to viewing axis V related to the main light emission direction A. The light sources 3 illuminate the face 4 of the occupant 1, sitting on the driver's seat and holding the steering wheel 11 in front of the dashboard 10. The embodiment shows the accommodation of the camera 5 and display 9 in or in conjunction with the dashboard 10.

Figure 4:
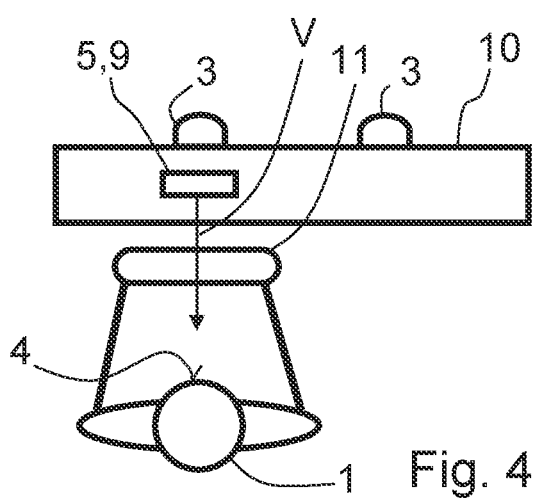
FIG. 4 illustrates a second embodiment of positioning the light sources.

FIG. 4 shows a light source 3 directly in front of the face 4 of the occupant 1, and the light source 3 is arranged in the dashboard 10. In front of the light source 3 the camera 5 and/or the display 9 is arranged.

Figure 5:
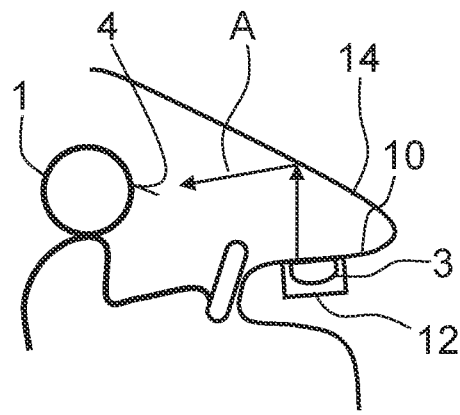
FIG. 5 illustrates a third embodiment of positioning the light sources of the system.

FIG. 5 shows a dashboard 10 with a head-up display 12, and the light source 3 can be part of the head-up display 12 to illuminate the face 4 of the occupant 1, when the light is reflected in the front screen 14 of the car.

Figure 6:
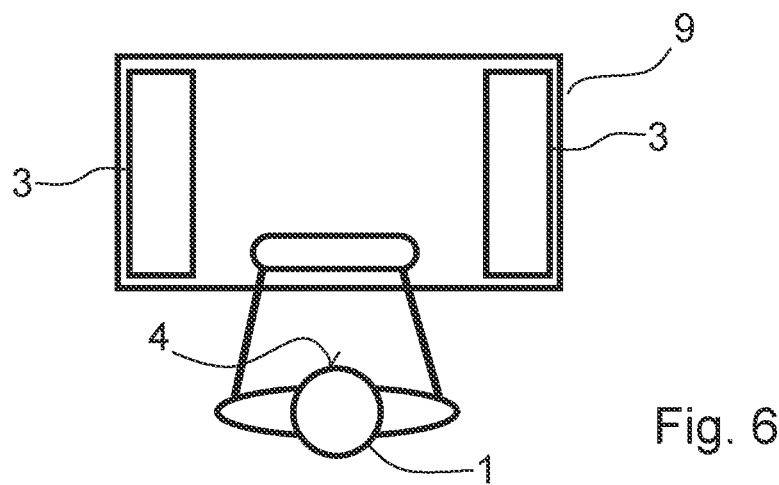
FIG. 6 illustrates a display of the system containing the at least one light source.

FIG. 6 shows a display 9 containing two light sources 3, which are formed by the display 9 itself or which are arranged in front of the display 9, in the side area or behind the display 9. When the occupant 1 views the display 9 the face of the occupant is illuminated by the light sources 3. The light source 3 can be integrated in the display 9 and can be formed by means of the surface emitter as a part of the LCD display, the light source 3 is then preferred an OLED surface emitter.

Figure 7:
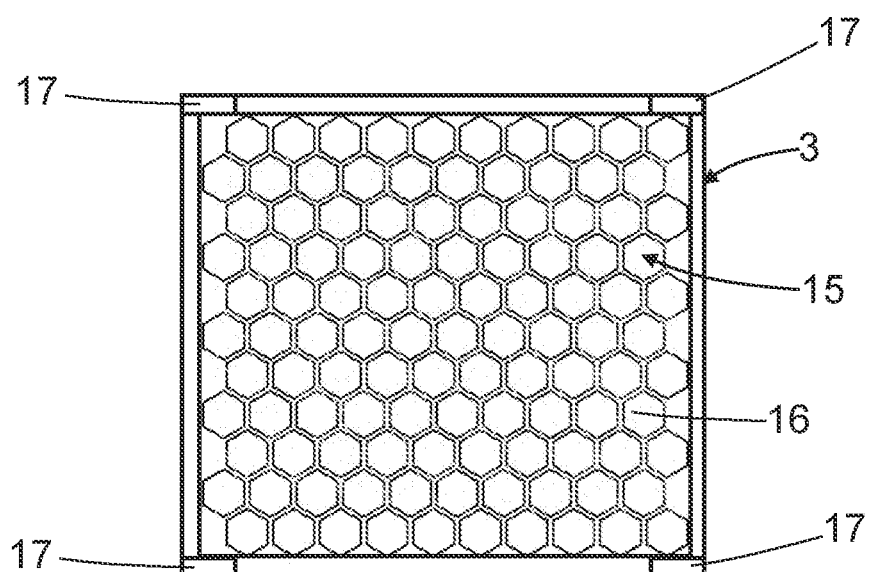
FIG. 7 illustrates an example glare shield arranged in front of a light source.

FIG. 7 shows the arrangement of a glare shield 15 in front of a light source 3. The glare shield 15 features a honeycomb-structure with openings 16, through which light passes when the light source 3 is activated. As an example the glare shield 15 is attached to the front of the light source 3 by means of magnet clips 17, and a user can attach and remove the glare shield 15 in an easy way to and from the front side of the light source 3 or any other holding element.

Figure 8:
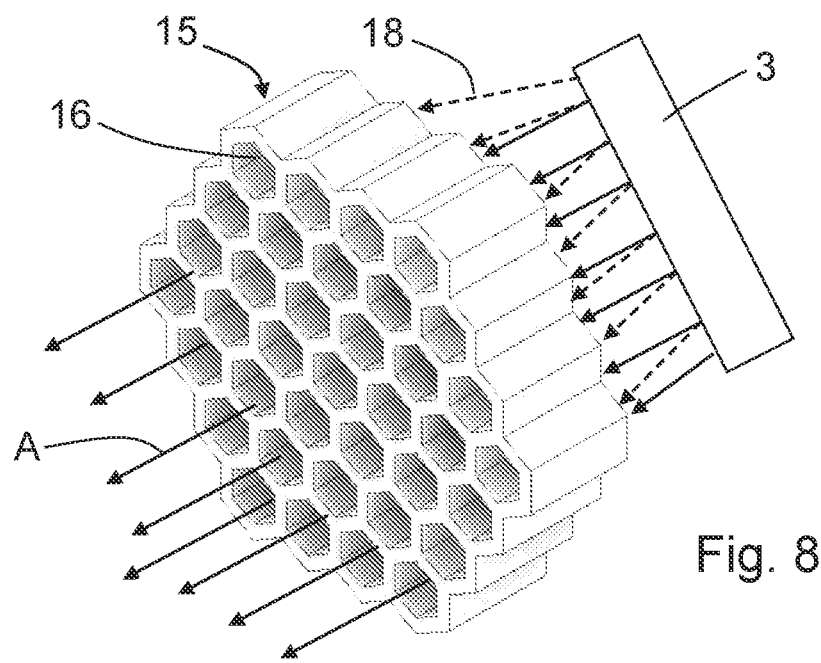
FIG. 8 illustrates an example glare shield having a honeycomb structure with openings.

FIG. 8 shows a glare shield 15 having a honeycomb structure with openings 16, through which light passes when the light source 3 is activated. As can be seen by the scattered light 18 emitted by the light source 3, the glare shield 15 reduces the scattered light 18 and the light can illuminate the face of the occupant by a main light emission direction A without or with strongly reduced scattered light 18 in order to reduce dazzle effects in the windows or sunroof of a car in which the system is applied.

The present invention is not limited by the embodiments described above, which are represented as examples only and can be modified in various ways within the scope of protection defined by the appending patent claims.

LIST OF NUMERALS 1 occupant
2 car
3 light source
4 face
5 camera
6 control unit
7 light sensor
8 face sensor
9 display
10 dashboard
11 steering wheel
12 head up display
13 head rest
14 front screen
15 glare shield
16 opening
17 magnet clip
18 scattered light 100 system
a angle
A main light emission direction
V viewing axis

We claim:

1. A system for illuminating a face of an occupant for a video call in a car, the system comprising:
   at least one light source having a main light emission direction (A) which is directed toward the face of the occupant;
   a camera provided to record the face of the occupant; and
   a control unit connected to the at least one light source and the camera, wherein the control unit receives a horizontal frequency of the camera and a pulse frequency of the at least one light source; and
   wherein the control unit controls the pulse frequency of the at least one light source to match the horizontal frequency of the camera to obtain a flickering free recording of the face of the occupant.

2. The system according to claim 1, wherein at least one light sensor is provided, which at least one light sensor is connected to the control unit, and the at least one light sensor is arranged to detect light of a surrounding area.

3. A method to operate a system according to claim 2, wherein the at least one light source is operated depending on at least one further information at least comprising light of the surrounding area received by the light sensor.

4. The method according to claim 3, wherein the at least one light source is operated depending on a skin color of the face of the occupant, received by a face sensor connected to the control unit, wherein the face sensor detects light in and/or the skin color of the face of the occupant.

5. The method according to claim 4, wherein at least one reference skin color of the face of the occupant is implemented into the control unit, and the at least one light source is operated such that the reference skin color of the face of the occupant depends on a content of a video call of the occupant.

6. The method according to claim 5, wherein the reference skin color depends on the content of the video call, and the control unit selects the reference skin color based on the content of the video call.

7. The method according to claim 3, wherein the at least one light source is operated depending on a content of a video call of the occupant which is received by the camera and displayed by a display connected to the control unit.

8. The system according to claim 1, wherein at least two light sources are provided, wherein a first light source of said at least two light sources is positioned such that the main light emission direction (A) comprises an angle (a) to a viewing axis (V) off the occupant.

9. The system according to claim 1, further including at least one face sensor connected to the control unit, wherein the face sensor detects light in and/or the skin color of the face of the occupant.

10. The system according to claim 1, wherein the at least one light source comprises a semiconductor emitter, and the at least one light source features a Color Rendering Index of at least 80.

11. The system according to claim 1, wherein the at least one light source has a color temperature range of 2700K to 5000K and/or intensity range amounts of 101 m to 9001 m.

12. The system according to claim 1, further including a display positioned in front of the occupant, wherein the display is connected to the control unit.

13. The system according to claim 1, further including a glare shield arranged in conjunction with the at least one light source.

14. The system according to claim 13, wherein the glare shield is arranged in front of the at least one light source in such a way that the main light emission direction (A) runs through the glare shield.

15. The system according to claim 13, wherein the glare shield is arranged in such a way that light emitted by the at least one light source is prevented from shining against the inner surface of windows or a sunroof of the car.

16. The system according to claim 13, wherein the glare shield includes openings through which light of the at least one light source travels.

17. The system according to claim 16, wherein the openings are at least one of honeycomb in structure and a grid of holes.

* * * * *